United States Patent
Gupta et al.

(10) Patent No.: US 8,435,430 B2
(45) Date of Patent: May 7, 2013

(54) METHOD FOR INCREASING THE RATE OF HEAT TRANSFER OF WOOD FIBRES

(75) Inventors: Arun Gupta, Kuantan (MY); Korada Viswanatha Sharma, Kuantan (MY); Rosli Mohd Yunus, Kuantan (MY); Anuj Kumar, Kuantan (MY)

(73) Assignee: Universiti Malaysia Pahang (MY)

( * ) Notice: Subject to any disclaimer, the term of this patent is extended or adjusted under 35 U.S.C. 154(b) by 0 days.

(21) Appl. No.: 13/220,719

(22) Filed: Aug. 30, 2011

(65) Prior Publication Data
US 2013/0048190 A1 Feb. 28, 2013

(51) Int. Cl.
*B27N 3/02* (2006.01)
*B27N 3/04* (2006.01)

(52) U.S. Cl.
USPC .......................................... 264/122; 264/109

(58) Field of Classification Search .................. None
See application file for complete search history.

(56) References Cited

U.S. PATENT DOCUMENTS

| | | | |
|---|---|---|---|
| 2003/0134137 A1* | 7/2003 | Laks et al. | 428/537.1 |
| 2012/0004356 A1* | 1/2012 | Burgard et al. | 524/432 |
| 2012/0041146 A1* | 2/2012 | Zhang et al. | 525/135 |

FOREIGN PATENT DOCUMENTS
WO  WO 2009/086141  *  7/2009

* cited by examiner

*Primary Examiner* — Mary F Theisen
(74) *Attorney, Agent, or Firm* — Galbreath Law Offices, P.C.; John A. Galbreath

(57) ABSTRACT

The present invention relates to a method for increasing the rate of heat transfer of wood boards by the use of nano particles of certain metal oxides. The invention relates to increasing the thermal conductivity of wood fibers during manufacturing of wood composites. It reduces the pressing time during production thereby increasing the overall production rate of wood composites and also increasing their strength and smoothness of surface.

10 Claims, 5 Drawing Sheets

METHOD FOR INCREASING THE RATE OF HEAT TRANSFER OF WOOD FIBRES

FIELD OF INVENTION

The present invention relates to a method for increasing the rate of heat transfer of wood fibres. The present invention thus aids in reducing the pressing time and thereby helps in increasing the production capacity of the existing wood composite industries.

BACKGROUND OF INVENTION

Wood industry plays a vital role in the international market and many countries focus on exporting wood based products. Manufacturing process of wooden fibreboards such as MDF and PB involves applying a substance called thermosetting resin to the wood fibres. Thermosetting resin is a material which hardens after heating and thus cannot be remolded. Hence it is used as adhesive in wood composites. During the production process it is necessary to increase the temperature in the core region for curing of the said resin. The temperature needs to be above 100° C. for few minutes. But due to the low conductivity of wood fibres it takes a lot of time for the temperature to reach 100° C. Boards are prepared by pressing the above mixture at particular temperature and pressure for certain time. Thickness of the board varies with the pressing time of the board. The rate of heat transfer decides the pressing time needed for that particular thickness of board. As wood is a bad conductor of heat and electricity, it takes longer time for pressing. Hence, the pressing time required for thicker boards (12 mm–13 mm) is more, being approximately 10 minutes or more for single batch. This reduces the production capacity, and this is a major issue in the wood industry Hence, there is a need to reduce the time required for pressing the boards and thereby increase the production capacity of the wood products. In order to achieve this, the rate of heat transfer has to be increased or in other words the heat conductivity of wood fibres has to be increased.

SUMMARY OF INVENTION

The present invention discloses a method for increasing the ability of wood fibres to transfer heat.

Accordingly, the present invention thus disclosed an improved method for manufacturing wood composite boards.

The invention will now be explained in more detail with the aid of the following detailed description and with reference to the attached drawings and further referring to the working examples.

DETAILED DESCRIPTION OF THE INVENTION

Figure 1:
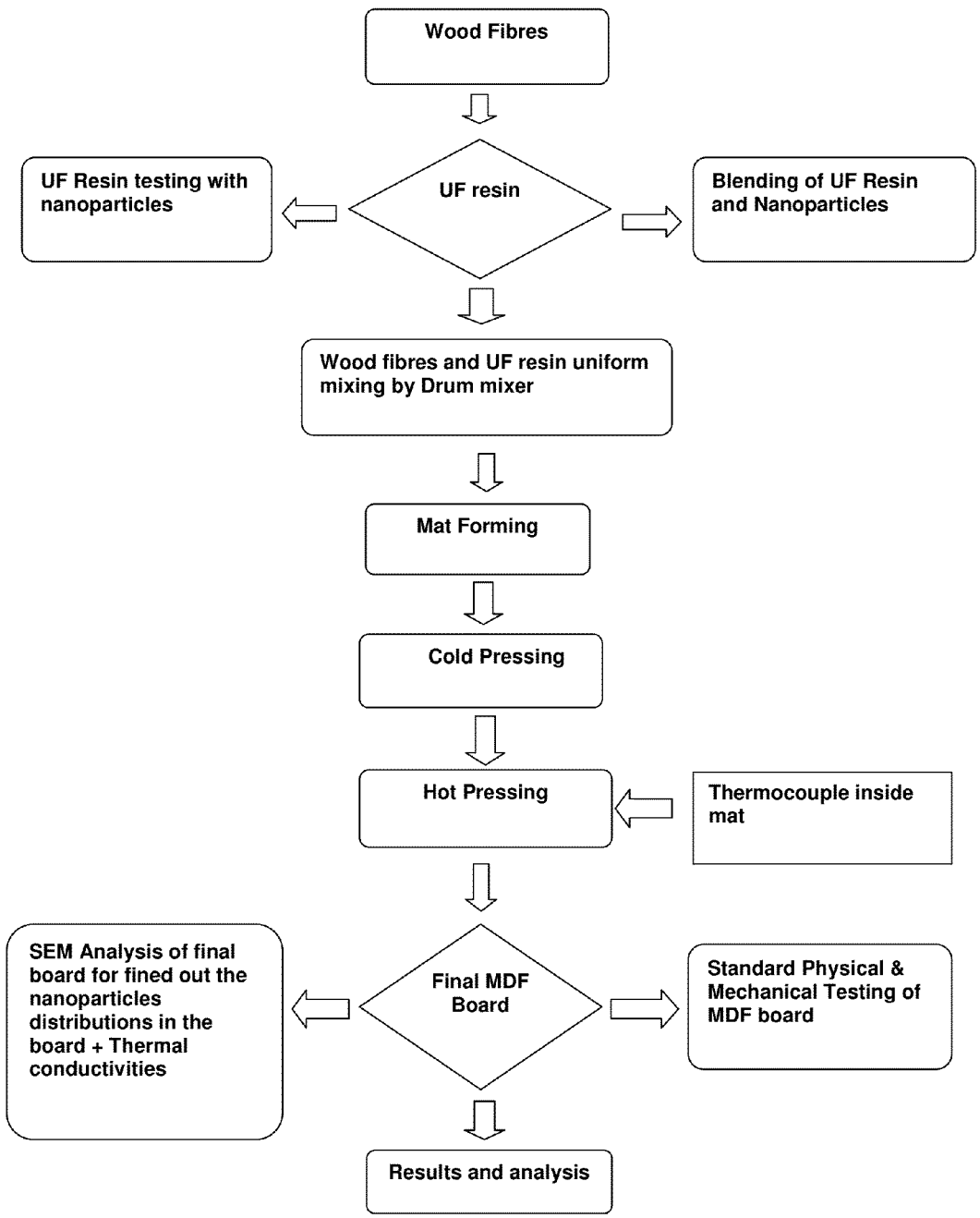
FIG. 1 illustrates the experimental method of the present invention according to one preferred embodiment.

FIG. 1 illustrates the experimental method of the present invention according to one preferred embodiment. First, the wood fibres, resin and nano particles are mixed and then subjected to mat forming. Subsequently the mat is pressed and finally formed into MDF of desired thickness.

Medium density fiberboards (MDF) are available in a range of thicknesses from 2 to 100 mm and a very wide range of panel sizes. The density of these panels varies from about 500 to 900 kg/m3; panel density tends to increase as panel thickness decreases. Panels have smooth, high density faces and are pink-brown to dark brown in colour, unless a dye has been added during manufacture Since the beginning of industrial wood-based panel manufacture, most research and development efforts have focused on the technical and economical optimization of both processes and products. Performance demands on panels have increased steadily over this period, while minimization of manufacturing costs per unit output was sought simultaneously.

The function of the hot press in MDF production is for compaction of the fibres to desired thickness and density followed by polymerization of the adhesive between adjacent fibres into a cross-linked solid polymer to hold the mat in this consolidated state when removed from the press. To facilitate the chemical reaction and allow reasonable press times, all production presses in the composite industry employ some method of heating the mat. Most commonly, this is done by heated platens which contact the mat surfaces. Heat then flows from the platens through the mat surfaces into the interior. Because the entire board is not uniformly heated throughout the thickness, the curing of the adhesive does not occur uniformly; the adhesive at the mat surface cures first and later at the central region. Because the mat center is always at the lowest temperature, the pressing time and temperature should be such as to ensure the core reaches a sufficiently high temperature to allow the resin to cure. This can be accomplished by increasing the pressing time at a constant temperature or by increasing the press temperature keeping pressing time constant.

The heat transfer is governed by convection or moisture migration throughout the mat during pressing. Conduction is more important for heat transfer between the platen and mat interface. The importance of convection during pressing is one of the reasons why strands are not dried lower than 5% by weight. Without enough moisture present in the mat, there will not be sufficient heat transfer during hot-pressing, resulting in long press times and over cured face layers. The hot platens heats the surfaces of the mat while the center of the mat remains cool when placed in the press.

The primary mode of heat transfer from the platen to the surface of the mat is by conduction. As the surfaces of the mat heat up water within the mat evaporates. A temperature and vapor pressure gradient quickly forms within the mat. The steam follows this gradient to the cooler center where it condenses and releases its latent heat. The primary mode of heat transfer within the mat during pressing is convection. The steam also escapes out the edges of the mat, where there is a temperature and vapor pressure gradient between the mat and the ambient air. The condensation of moisture from the face to the core also creates a moisture gradient throughout the mat, which becomes more prominent with pressing time.

As the center of the mat gets heated, moisture in the mat evaporates and continues to follow the temperature and vapor pressure gradients that remain at the edges of the board. Near the end of pressing the entire mat has heated up with a moisture gradient formed within the mat due to the steam migration that occurs at the beginning of pressing. There is high moisture content at the center of the mat where steam condenses and low moisture content at the surfaces due to evaporation of water. It is believed that conduction mode is significant in locations where the moisture content is low due to vapor loss. The interaction between conduction, convection and phase change affects the thermal conductivity, density, and permeability of the mat, and continual loss of vapor and heat from the edges of the mat in the press. These interactions are important to understand the mechanism of heat transfer within the mat and its impact on curing of resin. The conductivity of composites can be predicted provided suitable assumptions are made about the flow of heat through the constituents, i.e. the shape of the isotherms.

The manufacture of MDF could be improved by developing a method to shorten the cure time of the resin during hot-pressing, which could speed up production or improve overall quality of the board.

The invention focuses on increasing the rate of heat transfer inside the wooden fibreboards during the manufacturing of fibreboard. It describes a method for increasing the conductivity of wood fibres by the use of high thermal conductivity nano particles with thermosetting resins during manufacturing of fibreboards. It results in growth of manufacturing capacity of wood production units.

Figure 2:
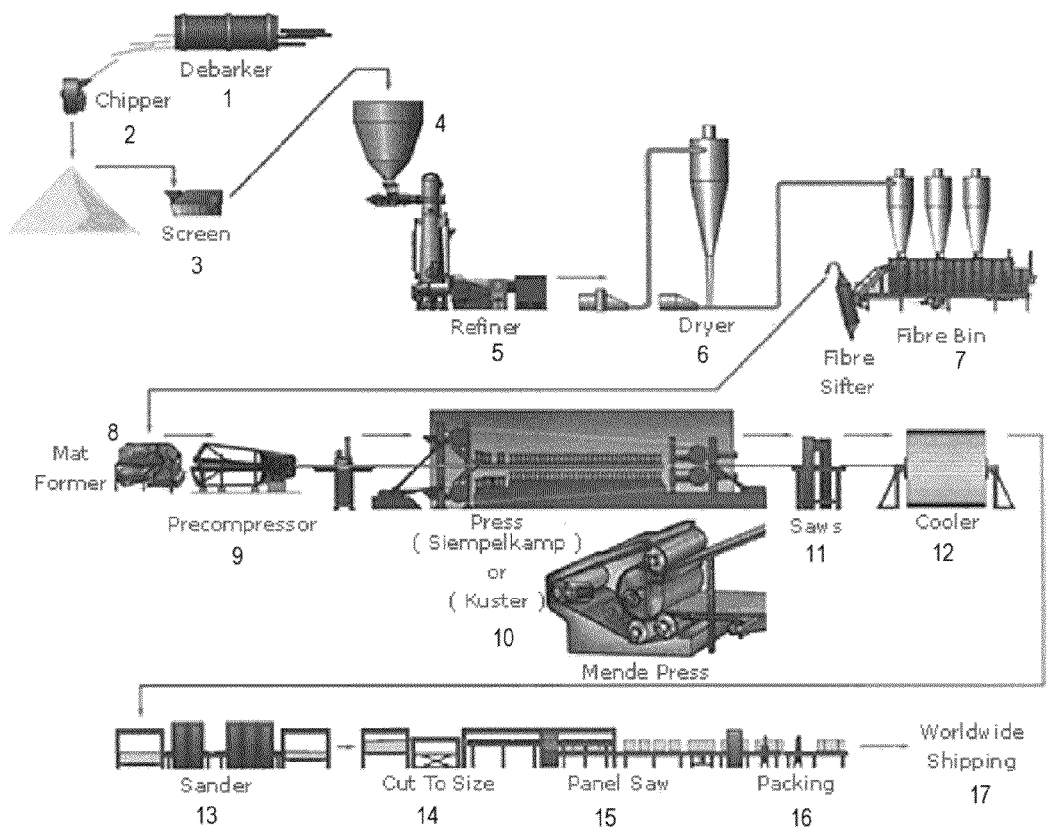
FIG. 2 illustrates the general method for manufacturing wood composite board in a large or industrial scale.

FIG. 2 illustrates an example of the industrial scale of such manufacture where the invention could be duly incorporated therein. The industrial process starts from the debarker (1), chipper (2) and a screen (3) to prepare the desired wood fiber. Subsequently the wood fibre is sent to a mixer (4) and then to a refiner (5). The refiner contains a mixture of the resin and the nanoparticle. The resin and nano particle mixture is blended together with the wood fibres, and then sent to a dryer (6) followed by a fibre bin (7). A fibre mat is formed in a mat former (8), and then subjected to a precompressor (9) and pressing (10). The resulting board is then cut to the desired dimensions, further treated and sanded (11,12,13,14,15,16), and the final product is packed for shipping.

The present invention is an innovative method to increase the rate of heat transfer of the wood-board by means of adding nano particles of metal oxides (high thermal conductivity) namely Copper oxide, Aluminium oxide, and Ferrous oxide, into the thermosetting resin.

The results of the test shows that the use of the nano particles renders less time for pressing the wood-board and hence improves the overall production of wood composite manufacturing units.

In accordance with the invention, the method includes:
Preparing pure wood fibres.
Spraying the thermosetting resin (adhesive) such as Urea Formaldehyde (UF) and Phenol Formaldehyde (PF) on the said wood fibres. Other than spraying, the resin could also be directly applied to the wood fibres. Alternatively, the wood fibres could also be mixed or immersed in the resin solution.
Adding small percentage of high thermal conductivity nano particles such as Copper oxide, Aluminium oxide, Carbon and Ferrous oxide to the fibre and resin mixture.
Subjecting the above mixture to pressing to form a fibre under high pressure 6 Megapascal (MPa) and high temperature of 180° C.
In order to measure the Core temperature inside the board continuously, a thermocouple wire is inserted inside the core of the mat.
The above preparation method is then repeated to produce several boards by applying different percentage and various types of nano particles.
All the produced boards are tested for standard mechanical and physical tests and also for thermal conductivity. Additionally, the results are analyzed for different boards and depending on those results if significant improvement in the heat transfer is observed then the pressing conditions are optimized. The experimental results are further compared with the theoretical model of heat and mass transfer of MDF.

The material along with the quantity required and the methodology used for the process is explained below:

1] The preferred standard board dimensions are 15 cm×15 cm, along with the thickness of the board as 6 mm. According to the above dimensions volume of the board is calculated as:

Volume of cube(rectangular solid)=Length×Height× Width

Hence Volume of board=0.15 m×0.15 m×0.006 m=0.000135 m$^3$

Average density=800 kg/m$^3$ Density is measured as:

Density=Mass/Volume hence Mass=Density×Volume

Mass=800 kg/m$^3$×0.00135 m$^3$

Mass=0.108 kg mass of fibres to prepare for 1 board which is taken approximately as 0.2 kg of fibres for one board.

2] 12 boards are prepared by taking different samples of nano particles as follows:
a. First set of is of 4 standard boards without nano particles.
b. Second set is of 4 standard boards with aluminium oxide nano particles.
c. Third set is of 4 standard boards with copper oxide nano particles.

In total 12 boards are to be prepared. From the above calculations for mass as 0.2 kg of fibre is required for one board, about 2.4 kg of fibres are needed for 12 boards.

3] Resin needed for one board is about 10-20% of the total mass. Hence for one board 10% of 1.08 kg mass requires 0.0108 kg of resin and 12 boards require 10% of 2.4 kg i.e.0.24 kg of resin.

4] Nano particles required for one board is about 1% of the total mass. Hence for one board 1% of mass requires 0.0108 kg of nano particles and 12 boards require 1% of 24 kg i.e. 0.0024 kg of nano particles.

5] Preparing standard wood board: 0.108 kg of wood fibres is weighed and sprayed with 0.0108 kg of urea formaldehyde resin. The wood fibres in the shape of mat are formed of 15 cm×15 cm and of 6 mm thickness. The mat is then pressed with the help of platen which is a flat metal plate and is pressed against any medium.

The heat and mass transfer model developed by Gupta.et.al (2010) is used to predict the internal changes during hot pressing of nano-wood composites. The computer simulation model can predict temperature, vapor pressure, moisture content development and extent of cure of adhesive system during hot pressing. The said mat is pressed with the platen temperature of 198° C. and pressure of 6 Megapascal for duration of 9 min. The internal changes can be explained as below:
a. Beginning of hot pressing (0 seconds): At the beginning of hot pressing temperature of mat is uniform 27° C. and the temperature of the platen is about 198° C. The initial moisture content is assumed as 6.78% in the mat. The pressure inside the board is same as atmospheric pressure in the beginning. Relative humidity is assumed as 57% within mat. Cure index of thermosetting resin is zero in the beginning.

b. Press closing: During the press closing period which is 25 seconds the platen moves from initial position to final thickness of 19 mm. At this time the top and bottom surface of the mat reaches the platen temperature instantly but the temperature in the core area in the mat is still near the room temperature in the first 50 seconds. This large temperature gradient initiates conduction of heat transfer from the hot platens to the cooler core area. Then the resin near the surface starts curing due to high temperature at the surface and all the moisture content at the surface evaporates and increases the pressure in the core. Moisture content at the surface becomes zero which causes large moisture gradient between the surface and the core area of the mat which results in bound water diffusion. All the air is replaced by the water vapour soon after beginning of the hot pressing. As hot vapour cannot escape through the metal plate it will move by diffusion towards the center.

c. As the pressing time approaches the middle time of press cycle (300 seconds) the temperature near the surface layers approaches the platen temperature and the temperature near the core region approaches the boiling point of water. Moisture content at the surface is zero; the water vapour evaporated from the surface condenses in the core region. Hence the moisture content at the core region is increased. At this stage the resin curing is accelerated due to high temperature at all the layers. The curing index at all the layers lies within 0.5 to 0.8. The resin is almost cured when the curing index reaches 0.9.

d. During the last 300 seconds of the press cycle, the layers at the surface have almost reached platen temperature. Main source for heat flow is conduction. As there is no vapour pressure gradient the heat flow by convection slows down. Core region still have higher moisture content. Curing index at all the layers reaches a value near to 0.9 which denotes that the resin is almost cured in all the surfaces. Curing of the resin reduces the permeability of the board. The time taken for resin curing to reach the value above 0.9 is the optimum time for particular thickness because if the boards are not kept for sufficient time inside the press then the resin in the core will not be completely cured and the boards will have lower internal bonding strength.

6] Testing of wood boards: The manufactured boards conditioned for room temperature and are tested using tensile testing machine for internal bonding (IB), modulus of rupture (MOR) which determines strength and modulus of elasticity (MOE) which measures the stiffness of the material.

Mechanical test is carried out according to ASTM D1037-89 using universal wood testing machine including static bending test, modulus of rupture (MOR) and modulus of elasticity (MOE).

Physical test for dimensional stability and moisture content (MC) is performed. A dimensional stability test involves thickness swelling (TS) and water absorption (WA).

Thermal conductivity test is also conducted for a sample piece cut from the board.

These results are then compared for standard boards (without nano particles) and boards with nano particles. The distribution of nano particles inside the board is determined for the boards using scanning electron microscope (SCM).

Accordingly, the present invention relates to the method for manufacturing wood composite board, the method including the steps of forming a mixture of thermoset resin, wood fibers and a nano-filler having a high thermal conductivity; and pressing the mixture in a mould at high temperature and pressure to form the wood composite board.

Most preferred nano-fillers are selected from a group of metals oxide nanoparticles such as aluminum oxide, Iron oxide, copper dioxide, silicon dioxide nanoparticles etc and the carbon nanotubes (CNT) i.e. Single wall CNT, multiwall CNT etc.

Table below lists several of the nano-particles that can be used to enhance the thermal conductivity, including some other metal, metal alloys and metal oxides particles in the range of nano scale which could be used. The nano-fillers function as a means to promote resin cure and reduce water absorption and thickness swelling of the composite board.

The following experiment illustrates another embodiment of the method where instead of spraying, a mixture of the resin and nano-particles is sprayed onto the wood fibres directly.

| No. | Particle | Sizes |
|---|---|---|
| 1 | $Al_2O_3$ | <50 nm |
| 2 | | 13 nm |
| 3 | Cu | <100 nm |
| 4 | CuO | <50 nm |
| 5 | SiC | <100 nm |
| 6 | $SiO_2$ | 10-20 nm |
| 7 | | 5-15 nm |
| 8 | $TiO_2$ | <100 nm |
| 9 | | 21 nm |
| 10 | | <25 nm |
| 11 | ZnO | <100 nm |
| | | <50 nm |
| 12 | $ZrO_2$ | <100 nm |
| 13 | $Fe_2O_3$ | <50 nm |
| 14 | $Fe_3O_4$ | <50 nm |
| 15 | Fe/Ni alloy | <100 nm |
| 16 | Ag/Cu alloy | <100 nm |
| 17 | Ag/Sn alloy | <150 nm |

Experiment 1

Manufacturing MDF Board of 6 mm Thickness Using Aluminium Oxide Nano Particles

The wood fibres are mixed uniformly with resin by means of arms mounted on the axis of a rotating drum. The resin is introduced with the aid of air pressure through a nozzle mounted on the top of the drum. A measured quantity of aluminum oxide nano-particles is mixed with the resin and sprayed into the rotating drum for homogenous mixing of fibres, nanoparticles and resin. Aluminium oxide nanoparticles are procured from Sigma Aldrich which has an average particle size of 50 nm. Eight numbers of boards were made with different percentage of nano-particles as given in table-1. A mat is formed by pre-pressing the mixture in a hydraulic cold press at a pressure of 4.90 MPa pre-pressing makes the particles in the mat compact for loading in the hot press. After preparing the mat with the cold press, a thermocouple wire is inserted at the core of mat. The mat is now subjected to a temperature of 180° C. for duration of 350 seconds at 11.76 MPa pressure. The source of heat is then stopped. During the cooling of the mat, the core temperature is recorded in every 10 second interval until the mat achieves the room temperature. Boards of 340 mm×340 mm and 6 mm thick are made in the pilot press facility available in the Faculty of Chemical and Natural Resources Engineering, UMP in this manner which has a density of 650 kg/m³ approximately.

TABLE 1

Number of boards made with different percentage of Nano particles

| Type of board | Weight fraction | Number of boards tested |
|---|---|---|
| Standard MDF | 0.0 | 2 |
| With 3.9 gm aluminium oxide | 0.9 | 2 |
| With 4.335 gm aluminium oxide | 1.0 | 2 |
| With 8.775 gm aluminium oxide | 2.0 | 2 |

Parameters Tested:

The samples were then tested for internal bonding, modulus of rupture (MOR) and modulus of elasticity (MOE). All tests are conducted according to the procedure specified in ASTM Standards 2000 by using Instron Corporation Series IX Automated Testing System.

The results of the mechanical test conducted on various boards prepared are given in Table-2.

TABLE 2

Mechanical tests conducted with the boards

| Type of board | Weight fraction | IB (MPa) | MOR (MPa) | MOE (MPa) |
|---|---|---|---|---|
| Standard Board | 0.0 | 0.39 | 27.1 | 2927.3 |
| With 3.900 gm nanoparticles | 0.9 | 0.42 | 23.1 | 3071.6 |
| With 4.335 gm nanoparticles | 1.0 | 0.48 | 21.0 | 3301.1 |
| With 8.775 gm nanoparticles | 2.0 | 0.41 | 22.0 | 3173.3 |

Temperature Profile

Figure 3:
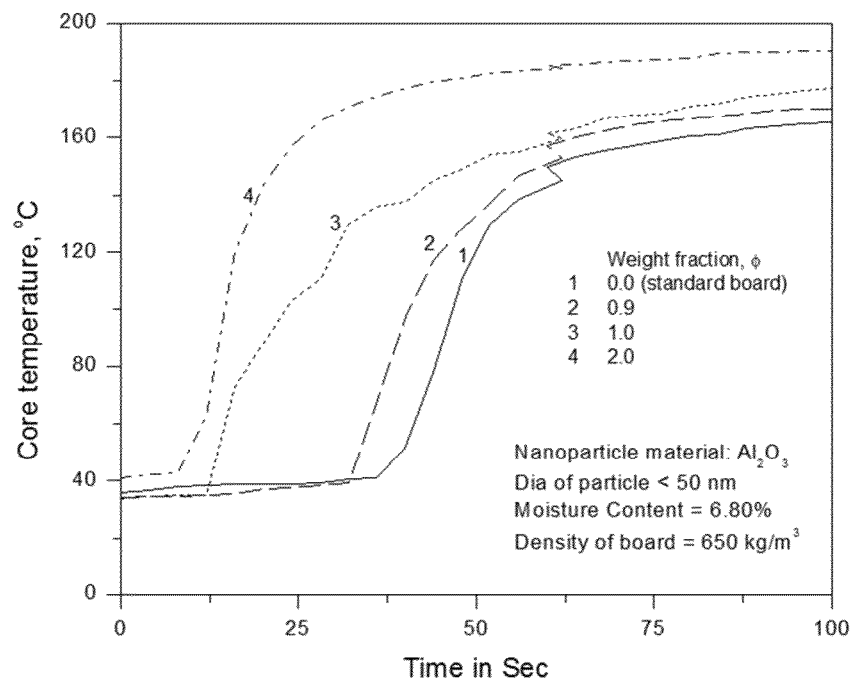
FIG. 3 illustrates the Variation of centre temperature with time in a 6 mm MDF board for different values of weight fraction of $Al_2O_3$ nanoparticles added during compression of mat.

The results from theoretical simulation are verified by conducting experiments by mixing nano particles with wood fibre and resin. Boards containing different weight fractions of nanoparticles are made and the temperature variation with time during compression of wood fibre mat in the hot press is shown in FIG. 3. FIG. 3 illustrates the Variation of centre temperature with time in a 6 mm MDF board for different values of weight fraction of $Al_2O_3$ nanoparticles added during compression of mat. The temperature is recorded every 10 seconds using K-type thermocouple located at the centre of the mat.

FIG. 3 shows that with the increase of high conductive nano particles the increase in core temperature is much faster in comparison to the standard boards. It will take approx 10-15% less time for the curing of resin and will enhance the rate of production of wood composite. Higher the weight concentration of nano particles, lesser is the pressing time required. The addition of 2.0% weight concentration of nano particles to the wood fibre reduces the pressing time by 15%. It can be observed that addition of 1.0% weight fraction of $Al_2O_3$ nanoparticles of less than 50 nm size gives maximum internal bonding (IB) and modulus of elasticity (MOE) having minimum value of rupture (MOR).

Experiment 2

Manufacturing of MDF Board of 12 mm Thickness Using Aluminium Oxide Nano Particles In these experiments, the same manufacturing process as experiment 1 was followed, the parameter that changes with thickness of board are hot pressing time, weight of fibres, weight of resin.

TABLE 3

Number of boards made with different percentage of aluminium oxide nano particles.

| Type of board | Weight fraction | Number of boards tested |
|---|---|---|
| Control MDF | 0.0 | 4 |
| MDF with $Al_2O_3$ Nanoparticles | 0.5 | 4 |
| MDF with $Al_2O_3$ Nanoparticles | 1.0 | 4 |
| MDF with $Al_2O_3$ Nanoparticles | 1.5 | 4 |

Core Temperature Profile During Hot Pressing of Nano-Wood Composite

Figure 4:
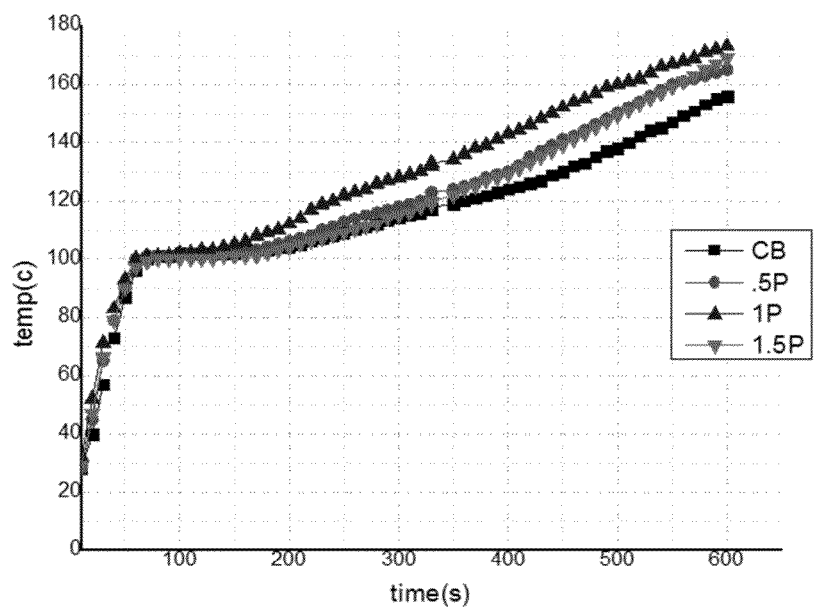
FIG. 4 shows temperature profile in the core of mat during hot pressing of 12 mm MDF boards with and without $Al_2O_3$ nanoparticles.

FIG. 4 shows temperature profile in the core of mat during hot pressing of 12 mm MDF boards with and without $Al_2O_3$ nanoparticles.

Figure 5:
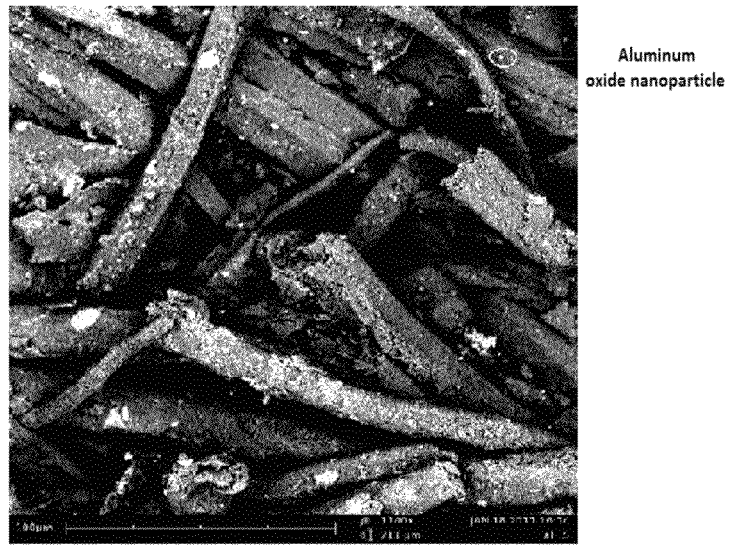
FIG. 5 shows the distribution of aluminium oxide nano particles inside the boards.
Figure 6:
FIG. 6 Shows the distribution of aluminium oxide nano particles inside the board.

Scanning Electron Microscope Analysis:

To check the uniform distribution of nano particles, SEM analysis was done. FIGS. 5 and 6 shows the SEM pictures taken to show the distribution.

Experiment Using Carbon Nano Tubes (CNT) Nano Particles to Make the Composite

MDF were manufactured as follows. Dried wood fibers (6% MC) with single walled carbon nanotubes were placed in a rotating-drum blender and mixed for 5 minutes and then sprayed with 10 percent liquid UF resin. The concentration of SWCNT was fixed at 1.0% of the oven dry weight of wood fibres.

The blended materials were manually placed in a 200-mm by 200-mm forming mat box and hot-pressed in a laboratory press using the following press cycle: press closing time=15 seconds to press stops; pressing times at stops=360 seconds; platen temperature=180° C. The panel thickness was 12 mm to give a targeted density of 750 kg/cm³.

Test specimens for property characterization were cut from the panels and conditioned to a constant weight in a walk-in temperature/humidity-controlled room, set at 12 percent equilibrium MC. The modulus of rupture (MOR), internal bond strength (IB), and thickness swelling after 24-hour immersion in cold water were determined in accordance with the procedure outlined in ASTM D1037-2005.

The effect of CNT on the heat transfer was also evaluated by recording the temperature profile at the center of the panels during hot-pressing. The internal mat temperature was recorded as the board was pressed using K-type thermocouples. MDF panels (12 mm thick and 750 kg/m³) were manufactured using commercial rubber wood fibers from Robin Resources Std. Bh. (Pahang, Malaysia) and liquid UF resin from Dynea Malaysia STD. BH.

Figure 7:
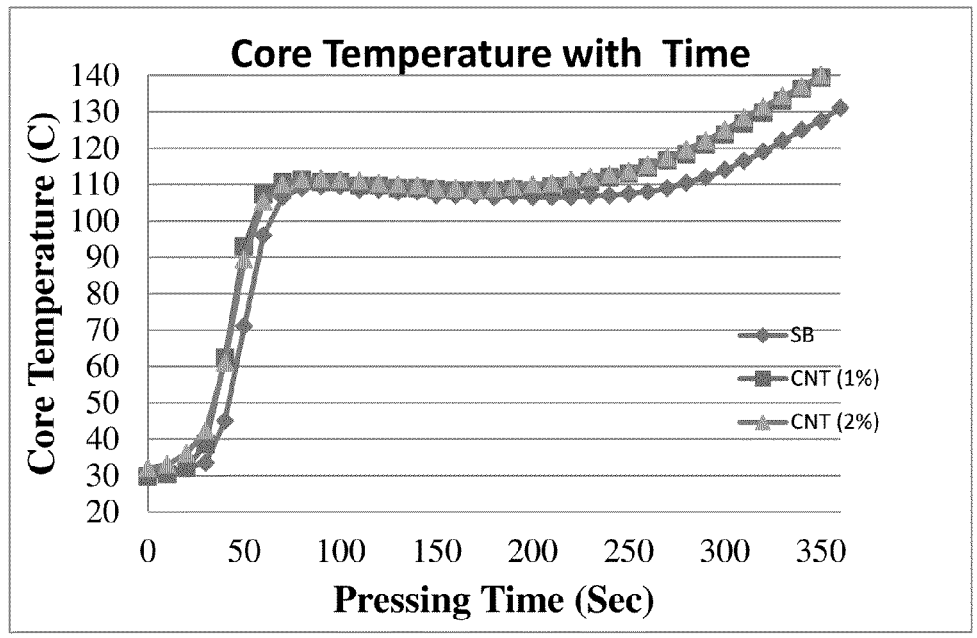
FIG. 7 shows the increase in core temperature using CNT

FIG. 7, shows that the boards with CNT nano particles shows fast increase of core temperature in comparison to the standard boards. CNT increases the rate of heat transfer and hence increases the rate of curing of urea formaldehyde adhesive.

Figure 8:
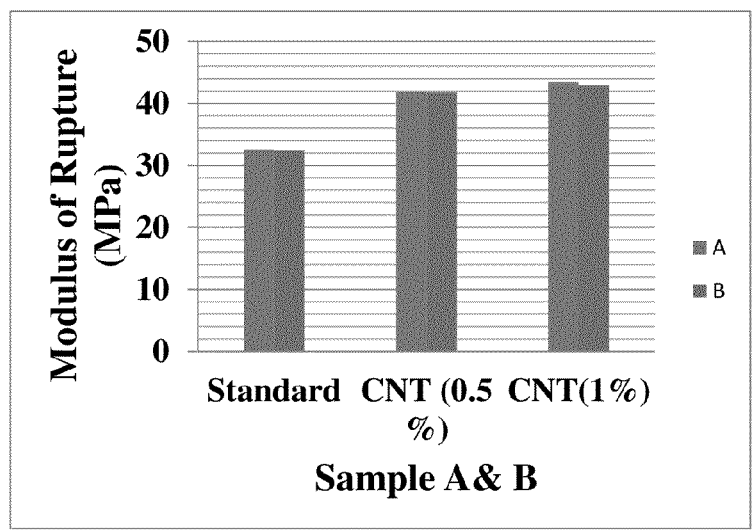
FIG. 8 shows the mechanical strength of Nano-wood composite in comparison with the standard boards.

FIG. 8, shows that CNT particle not only increases the rate of heat transfer but also the bending strength (Modulus of rupture). There is a significant increase in the strength of the boards.

CONCLUSION

It was found that the addition of nano-particles increases the heat transfer during hot pressing, and thereby helps increase the production capacity of the plant. The improved method will also reduce the amount of formaldehyde emission and enhance the mechanical properties of boards. Finally, it is also found that different nano-particles have different impact on the heat transfer, depending on the thermal conductivity of the nano particles.

The present invention has been described above by considering particular embodiments. However these specifics should not be interpreted as restrictions of the scope of the invention. Other modification or substitution may be made to the described invention i.e. the process as well as component materials, without departing from the broad scope of invention. The following claims and their legal equivalents should determine the scope of the invention.

The invention claimed is:

1. A method for increasing the rate of heat transfer inside wood fibres including the steps of:
   forming a mixture of thermosetting resin, a nano particle and wood fibres, wherein the nano particle is a high thermal conductivity metal oxide; and
   subjecting the mixture at a predetermined temperature and predetermined pressure for a specified time duration to form wood-boards of particular thickness.

2. The method as claimed in claim 1, wherein the wood fibres are obtained from Medium density fibreboard (MDF) plants or particle board (PB) plants.

3. The method as claimed in claim 1, wherein thermosetting resin is Urea Formaldehyde (UF), Urea Melamine Formaldehyde (UMF) and Phenol Formaldehyde (PF).

4. The method as claimed in claim 1, wherein the high thermal conductivity metal oxide is selected from the group consisting of Copper oxide, Aluminium oxide, and Ferrous oxide.

5. The method as claimed in claim 1, wherein the predetermined temperature is 180-200° C.

6. The method as claimed in claim 1, wherein the predetermined pressure is 5-8 MPa.

7. The method as claimed in claim 1, wherein the quantity of resin required is 10-15% of the said mixture.

8. The method as claimed in claim 1, wherein the quantity of nano particles is 1-10% of the said mixture.

9. The method as claimed in claim 1, wherein the rate of heat transfer is increased by 5-20% compared to the rate of heat transfer inside wood fibres mixed with thermosetting resin but without nano particles.

10. The method as claimed in claim 1, wherein the pressing time is decreased by at least 5-10% compared to the pressing time for wood-boards formed with a mixture of wood fibres and thermosetting resin but without nano particles.

* * * * *